United States Patent
Huh et al.

(10) Patent No.: US 10,733,021 B2
(45) Date of Patent: Aug. 4, 2020

(54) SYSTEM OF CLOUD COMPUTING AND METHOD FOR DETACHING LOAD IN CLOUD COMPUTING SYSTEM

(71) Applicant: University-Industry Cooperation Group of Kyung-Hee University, Yongin-si, Gyeonggi-do (KR)

(72) Inventors: Eui Nam Huh, Yongin-si (KR); Yunkon Kim, Yongin-si (KR); Jun Young Byun, Seongnam-si (KR)

(73) Assignee: University-Industry Cooperation Group of Kyung-Hee University, Yongin-Si (KR)

( * ) Notice: Subject to any disclaimer, the term of this patent is extended or adjusted under 35 U.S.C. 154(b) by 94 days.

(21) Appl. No.: 16/135,588

(22) Filed: Sep. 19, 2018

(65) Prior Publication Data

US 2019/0087231 A1    Mar. 21, 2019

(30) Foreign Application Priority Data

Sep. 19, 2017    (KR) .................. 10-2017-0120453

(51) Int. Cl.
*G06F 15/173*    (2006.01)
*G06F 15/16*    (2006.01)
(Continued)

(52) U.S. Cl.
CPC ........ G06F 9/5027 (2013.01); G06F 9/45558 (2013.01); G06F 9/5077 (2013.01);
(Continued)

(58) Field of Classification Search
CPC ....... H04L 67/10; H04L 67/42; G06F 9/5027; G06F 9/5077; G06F 9/45558; G06F 2009/45562; G06F 2009/45579
(Continued)

(56) References Cited

U.S. PATENT DOCUMENTS 7,444,398 B1 *  10/2008  Matthews ............... H04L 29/06
                                                     709/226
8,782,189 B2 *  7/2014   Akiyama ................ H04L 12/14
                                                     709/223
(Continued)

FOREIGN PATENT DOCUMENTS

JP    2016-5525757 A    8/2016
KR    10-2015-0011250 A    1/2015
(Continued)

OTHER PUBLICATIONS

Yunkon Kim et al.; "Study on Cloud Gradual Decentralization Model for Distributed Cloud Environment"; Korea Computer Congress 2017; Jun. 2017; pp. 1181-1183.

*Primary Examiner* — Bharat Barot
(74) *Attorney, Agent, or Firm* — Studebaker & Brackett PC

(57) ABSTRACT

Disclosed is a cloud computing system that includes: a core cloud part that stores and manages the cloud service in the core cloud server; and an edge cloud part that is arranged on a network node connected with the client terminal to form an edge cloud server, operates a portion or an entirety of a cloud service of the core cloud part at the edge cloud server, and stores and manages data of said service or receive cloud service packet information from the core cloud part to provide the cloud service to the client terminal. The edge cloud part includes an edge cloud awareness part that determines whether or not identification is possible for a cloud service request signal transmitted from a publisher client terminal, and an edge cloud processing part that determines whether or not to provide the cloud service corresponding to the request signal.

13 Claims, 8 Drawing Sheets

(51) Int. Cl.
  *G06F 9/50* (2006.01)
  *H04L 29/06* (2006.01)
  *H04L 29/08* (2006.01)
  *G06F 9/455* (2018.01)

(52) U.S. Cl.
  CPC .............. *H04L 67/10* (2013.01); *H04L 67/42* (2013.01); *G06F 2009/45562* (2013.01); *G06F 2009/45579* (2013.01)

(58) Field of Classification Search
  USPC .................................. 709/202–203, 225–229
  See application file for complete search history.

(56) References Cited

U.S. PATENT DOCUMENTS

| | | | | |
|---|---|---|---|---|
| 8,909,769 | B2* | 12/2014 | Radhakrishnan ... | H04L 41/0823 709/224 |
| 9,569,195 | B2* | 2/2017 | Schekochikhin ..... | G06F 9/5077 |
| 9,843,485 | B2* | 12/2017 | Desai ...................... | H04L 67/10 |
| 2013/0110913 | A1* | 5/2013 | Heo .................... | H04L 67/1008 709/203 |
| 2018/0376338 | A1* | 12/2018 | Ashrafi .................. | H04L 67/10 |

FOREIGN PATENT DOCUMENTS

| KR | 10-1563292 B1 | 10/2015 |
|---|---|---|
| KR | 10-2016-0065672 A | 6/2016 |

\* cited by examiner

SYSTEM OF CLOUD COMPUTING AND METHOD FOR DETACHING LOAD IN CLOUD COMPUTING SYSTEM

BACKGROUND

1. Technical Field

The present invention relates to a cloud computing system and a method of detaching load in a cloud computing system, more particularly to a cloud computing system and a method of detaching load in a cloud computing system that can distribute the load created while providing a cloud service to improve the overall speed and efficiency of the cloud service and furthermore maximize the intended effects in the fields of virtual or augmented reality where real-time interactions are required.

2. Description of the Related Art

With technological advances in the field of computer networks, the existing computing environment that relies on the independent hardware performance of each terminal is evolving towards a cloud computing form, which utilizes all of the computing resources in a network to provide corresponding services according to requests from the terminals.

Here, a cloud computing service can be defined as an 'on-demand outsourcing service of computing resources' over an information communication network such as the Internet. That is, a cloud computing service may entail a service provider providing the services required by the users by integrating data centers distributed across several places in a cloud computing environment.

Also, a service user, instead of using the computing resources after installing the resources needed for applications, storage, the operating system (OS), security, etc., on every terminal owned by the user, may use services from a virtual space generated via virtualization technology, using the services to a desired extent at a desired time. Generally, the user would make payments based on the amount used rather than making a payment for purchasing each computing resource.

Establishing a data center for providing such cloud computing services may involve virtualizing the computing resources that make up the data center to provide services to the users.

Also, in an existing cloud computing system of a centralized type, load can be created when service requests are concentrated on a core cloud that is directly connected to the cloud server, and thus, there is a need for a technique which enables suitably expanding the computing resources for providing services in accordance with increases in the number of accessed users or traffic.

A representative example of a technique for expanding the computing resources that compose a data center when there is increased traffic or an increased number of accessed users according to the related art is the scale-out technique, which involves increasing the number of servers that handle a particular service when traffic or access to the servers handling the particular service in the data center is increased.

Here, the scale-out technique entails horizontal expansion, increasing the nodes (units) in the system for processing a service. However, when establishing a data center based on cloud computing services, the data center is not established in a single area but is territorially distributed, and service is provided to the users by integrating the resources of data centers over a network via virtualization technology.

With the scale-out technique based on the related art, there is insufficient consideration of the fact that, for a cloud computing service, data centers are established in a regionally distributed form.

As such, there is an urgent need for technology that can efficiently remedy the limits of the conventional cloud computing system.

PATENT DOCUMENTS

Korean Registered Patent No. 10-1563292

SUMMARY OF THE INVENTION

An objective of the invention is to provide a cloud computing system and a method of detaching load in a cloud computing system that can distribute the load created while providing a cloud service to improve the overall speed and efficiency of the cloud service and furthermore maximize the intended effects in the fields of virtual or augmented reality where real-time interactions are required.

A cloud computing system according to an embodiment of the invention, in which a cloud server that provides a cloud service and client terminals that request or are provided with the service are connected over a particular network, may include: a core cloud part that is connected to the cloud server to form a core cloud server and is configured to store and manage the cloud service in the core cloud server; and an edge cloud part that is arranged on a network node connected with the client terminal to form an edge cloud server, configured to operate a portion or an entirety of a cloud service of the core cloud part at the edge cloud server, and configured to store and manage data of said service or receive cloud service packet information from the core cloud part to provide the cloud service to the client terminal, where the edge cloud part may include an edge cloud awareness part that is configured to determine whether or not identification is possible for a cloud service request signal transmitted from a publisher client terminal, from among the client terminals, and an edge cloud processing part that is configured to determine whether or not to provide the cloud service corresponding to the request signal in the event of an identification by the edge cloud awareness part.

Also, the edge cloud awareness part may transmit the request signal to the core cloud part if identification is not possible for the cloud service request signal and may transmit the request signal to the edge cloud processing part if identification is possible, and the edge cloud processing part may decide whether or not to provide the cloud service by comparing the cloud service corresponding to the received request signal with cloud service resources stored in the edge cloud server.

Also, if a result of the comparison is that a cloud service corresponding to the request signal exists in the edge cloud server, the edge cloud processing part may provide said cloud service to a subscriber client terminal wishing to receive the cloud service corresponding to the request signal, and if a cloud service corresponding to the request signal does not exist, the edge cloud processing part may transmit the request signal to the core cloud part.

Also, the core cloud part may recognize the request signal transmitted from the edge cloud part and may subsequently provide a corresponding cloud service to the subscriber client terminal.

Also, the core cloud part may not create a backward packet for providing to the edge cloud part, if the subscriber client terminal is not connected to the edge cloud part that has transmitted the request signal.

Also, a regional cloud part may further be included, which may be arranged on a network node between the core cloud part and the edge cloud part to form a regional cloud server, configured to operate a portion or an entirety of a cloud service of the core cloud part at the regional cloud server, and configured to store and manage data of said service or receive cloud service packet information from the core cloud part to provide the cloud service to the client terminal.

Also, the regional cloud part may include a regional cloud awareness part and a regional cloud processing part, the regional cloud awareness part configured to determine whether or not identification is possible for a cloud service request signal transmitted from the publisher client terminal, and the regional cloud processing part configured to determine whether or not to provide a cloud service corresponding to the request signal in an event of an identification by the regional cloud awareness part.

Also, if a cloud service corresponding to the request signal exists in the regional cloud server, the regional cloud processing part may provide said cloud service to a subscriber client terminal wishing to receive the cloud service corresponding to the request signal, and if a cloud service corresponding to the request signal does not exist, the regional cloud processing part may transmit the request signal to the core cloud part.

A method of detaching load in a cloud computing system according to an embodiment of the invention may be a method of detaching load in a cloud computing system in which a cloud server that provides a cloud service and client terminals that request or are provided with the service are connected over a particular network, and the method may include: step no. 1 of arranging an edge cloud, which may be formed with a particular cloud server, on a network node connected to the client terminal; step no. 2 of determining whether or not identification is possible for a cloud service request signal transmitted from a publisher client terminal from among the client terminals at the edge cloud; step no. 3-1 of providing a cloud service corresponding to the request signal to a subscriber client terminal wishing to receive the cloud service, if the cloud service corresponding to the request signal is being operated at a cloud server of the edge cloud, and if it is determined in said step no. 2 that identification is possible for the request signal; step no. 3-2 of transmitting the request signal to a core cloud that is connected to a cloud server and formed with a particular cloud server, if it is not determined in said step no. 2 that identification is possible for the request signal or if the cloud service corresponding to the request signal is not being operated at the cloud server of the edge cloud; step no. 4-1 of not creating a backward packet for providing to the edge cloud, if the subscriber client terminal is not connected to the edge cloud that has transmitted the request signal; and step no. 4-2 of identifying the request signal and subsequently providing the cloud service corresponding thereto to the subscriber client terminal.

Also, in step no. 3-1, the cloud service stored in the cloud server of the edge cloud may be a portion of the cloud service operated at the cloud server of the core cloud.

An aspect of the invention can minimize load in a cloud environment and provide cloud services at a high speed.

Also, an embodiment of the invention can be optimally applied to fields that require real-time interactions or fields that require high mobility.

Also, an embodiment of the invention can be optimally applied to active, realistic, aware services, the scope of which services that could be provided by conventional cloud services was limited.

DETAILED DESCRIPTION OF THE INVENTION

Figure 1:
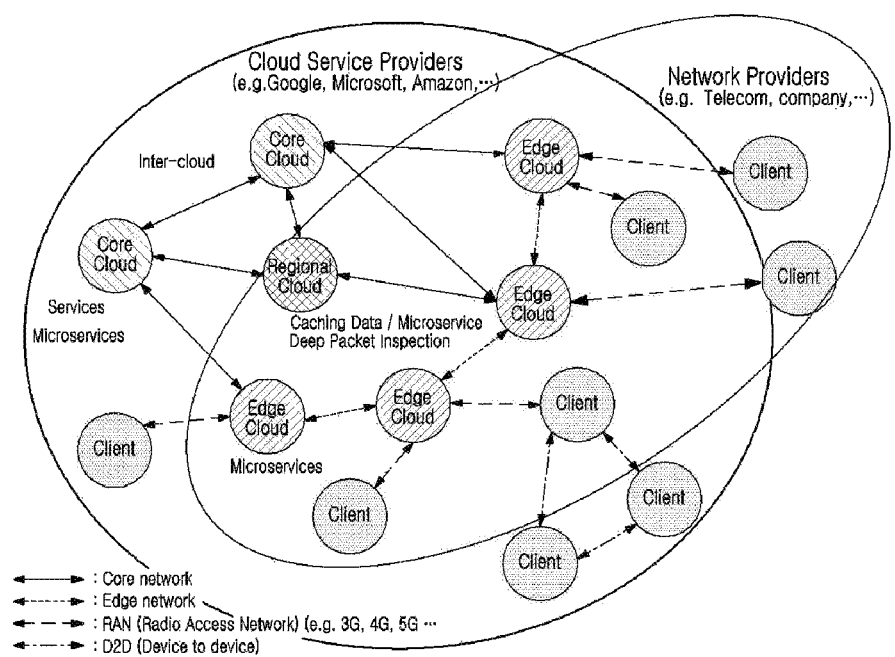
FIG. 1 is a conceptual diagram of the distributed cloud environment and administrative domain of a cloud computing system according to an embodiment of the invention.

Descriptions of specific structures or functions relating to certain embodiments derived based on the concept of the present invention as set forth in the present specification are provided merely as examples for explaining the embodiments derived from the concept of the invention. The embodiments can be practiced in a variety of forms and are not limited to the embodiments described herein.

As the present inventive concept allows for various changes and numerous embodiments, certain embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the present invention are encompassed in the present invention.

While such terms as "first", "second", "no. 1", "no. 2," etc., may be used to describe various components, such components must not be limited to the above terms. The above terms are used only to distinguish one component from another. For example, a first component may be referred to as a second component without departing from the scope of rights of the present inventive concept, and likewise a second component may be referred to as a first component.

When reference is made to one component being "connected to" or "accessed by" another component, it should be appreciated that, while the one component and the other component can be directly connected or directly accessed, the components can be connected or accessed by way of one or more other components interposed therebetween. In contrast, if reference is made to one component being "directly connected" or "directly accessed by" another component, it is to be understood that there are no other components present in-between. Expressions relating to the relationships between components, such as "between" and "immediately between" or "directly adjoining", etc., are to be interpreted in a similar manner.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by the person having ordinary skill in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

Certain embodiments are described below in more detail with reference to the accompanying drawings. However, the scope of the patent application is not to be restricted by or limited to these embodiments. In the drawings, like reference numerals represent like elements.

First, the concept of the cloud computing system according to an embodiment of the invention is described below, with reference to FIG. 1.

FIG. 1 is a conceptual diagram of the distributed cloud environment and administrative domain of a cloud computing system according to an embodiment of the invention.

As illustrated in FIG. 1, the distributed cloud environment of a cloud computing system according to an embodiment of the invention can include core clouds, regional clouds, and edge clouds.

The centralized cloud used previously can correspond to a core cloud of FIG. 1. It may be preferable that edge clouds exist at locations close to the users and regional clouds be located between the edge clouds and the core clouds.

The edge clouds and regional clouds here may be developed forms of clouds having computing resources added to existing network equipment, and while such clouds may correspond to compositions that can be managed mainly by network providers such as telecommunication companies, the clouds can be practiced in the form of clouds made up by adding computing resources to household (personal) routers. In such cases, other administrative domain cases can also exist.

Also, the cloud service provider can have an administrative domain from the core cloud to the application of the client, from the perspective of providing services. That is, while there are telecommunication companies that own clouds, it can be preferable to assume that, internally, the clouds and the network domain are managed separately.

Thus, it can be said that, in the distributed cloud of a cloud computing system according to an embodiment of the invention, there are parts where collaboration is needed between the cloud service provider and the network provider.

Also, the distributed cloud of a cloud computing system according to an embodiment of the invention includes regional clouds and edge clouds as components, and such a composition may be based on concepts such as fog/edge computing (FC/EC), mobile edge computing (MEC), cloudlets, and micro-data centers (mDC), corresponding to a joint-structure of clouds and networks.

Thus, the distributed cloud scheme of a cloud computing system according to an embodiment of the invention carries the advantage of being able to reduce network delay by identifying services in the network and, if the service exists in an edge cloud, having the edge cloud close to the user (client terminal) provide the service speedily.

Next, the structure of a cloud service provided through a cloud computing system according to an embodiment of the invention is described below in comparison to a conventional cloud environment, with reference to FIG. 2 and FIG. 3.

Figure 2:
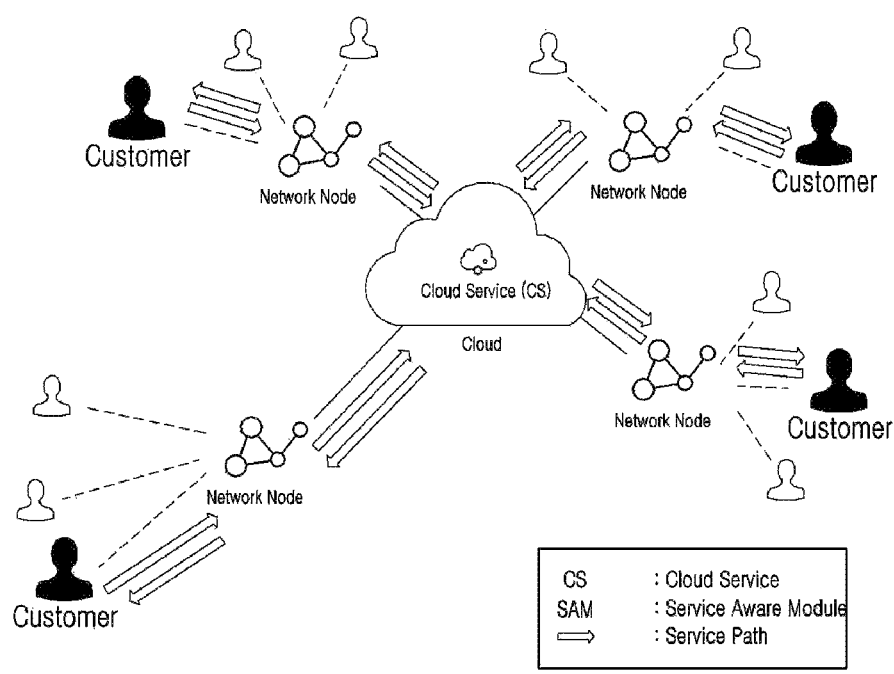
FIG. 2 is a conceptual diagram illustrating the structure of a cloud service provided in a centralized cloud environment according to the related art.
Figure 3:
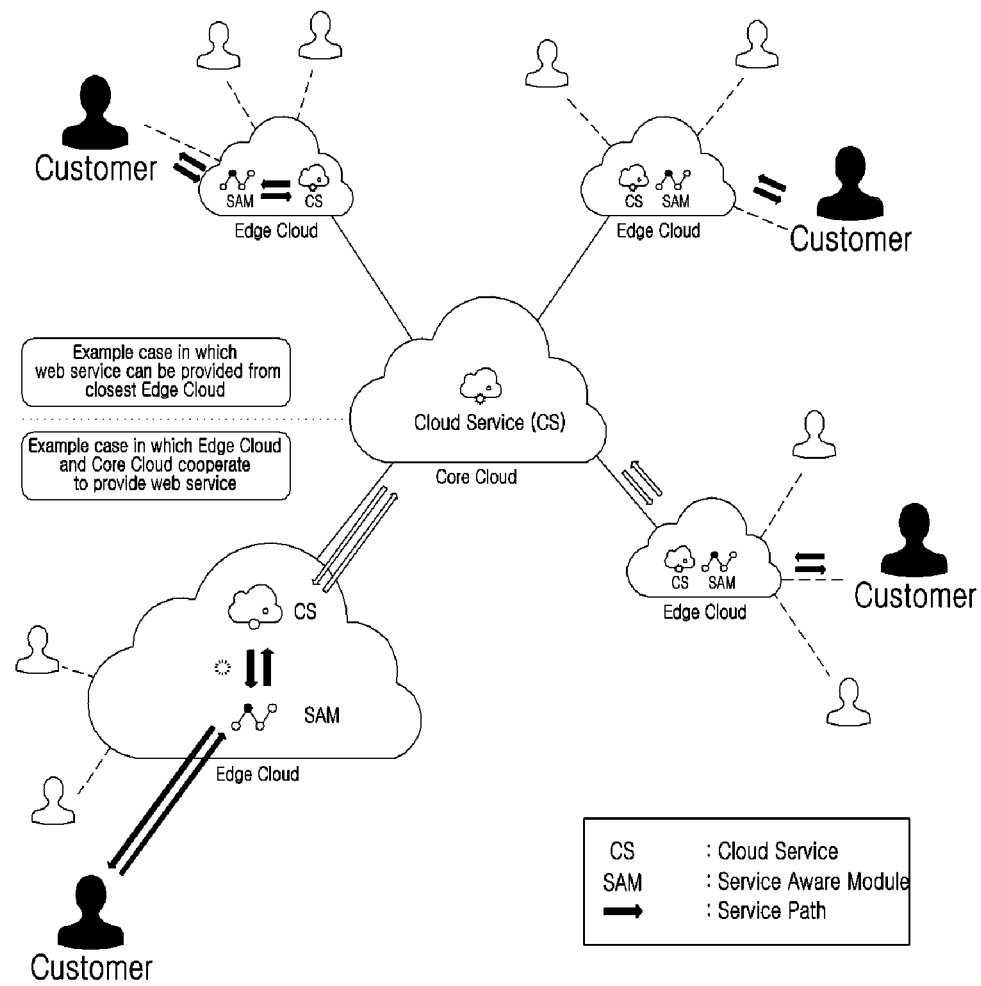
FIG. 3 is a conceptual diagram illustrating the structure of a cloud service provided through a cloud computing system according to an embodiment of the invention.

FIG. 2 is a conceptual diagram illustrating the structure of a cloud service provided in a centralized cloud environment according to the related art, and FIG. 3 is a conceptual diagram illustrating the structure of a cloud service provided through a cloud computing system according to an embodiment of the invention.

Based on FIG. 2 and FIG. 3, the flows of procedures for the centralized cloud service scheme according to the related art and the distributed cloud service scheme according to an embodiment of the invention are compared below.

First, as illustrated in FIG. 2, the cloud service of a centralized cloud environment according to the related art has the cloud server in a central cloud, so that the request of all clients (customers) may be concentrated at the center.

In contrast, as illustrated in FIG. 3, the distributed type cloud environment of a cloud computing system according to an embodiment of the invention may have cloud servers located at edge clouds close to the customers. As such, cloud services can be provided to the customers speedily, and the phenomenon of requests being concentrated at the center can be reduced. Obviously, in this case also, the edge cloud can provide a particular cloud service to a customer through cooperation with a core cloud.

For this type of distributed cloud environment, cooperation between the network and the clouds is essential. As in the case of the edge cloud of FIG. 3, an edge cloud can identify services on the network to determine whether or not there is a service possible from said edge cloud, and if so, can transfer this to the cloud service for processing and subsequently transfer the result to the user (customer) speedily.

Figure 4:
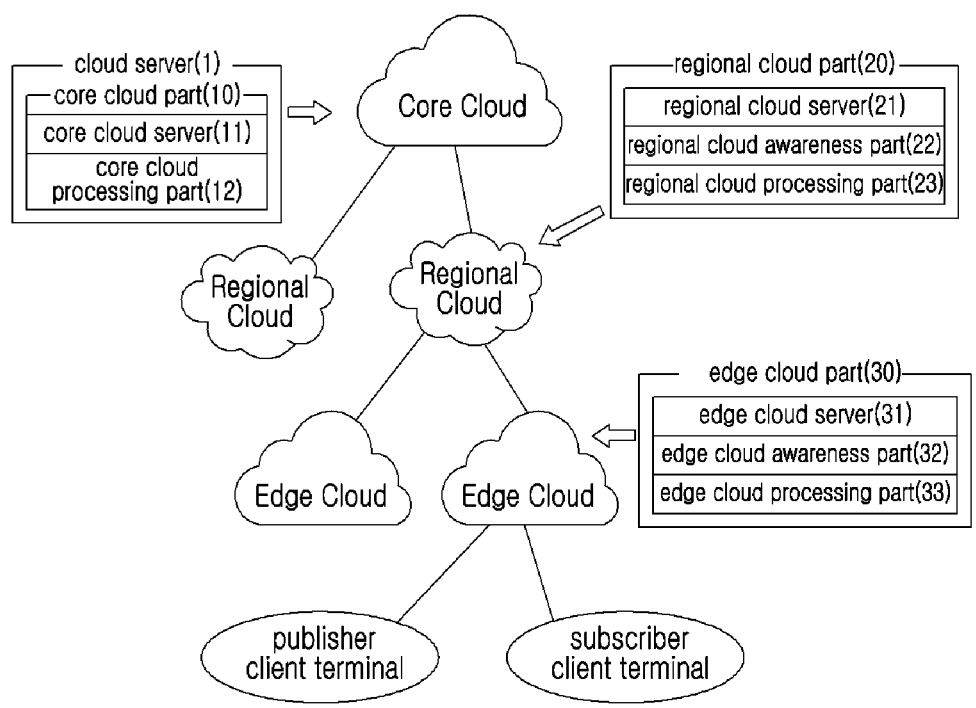
FIG. 4 is a block diagram illustrating the composition of a cloud computing system according to an embodiment of the invention.

Next, the composition of a cloud computing system according to an embodiment of the invention is described below, with reference to FIG. 4. FIG. 4 is a block diagram illustrating the composition of a cloud computing system according to an embodiment of the invention.

Basically, the clouds (core clouds, regional clouds, edge clouds) implemented in a cloud computing system according to an embodiment of the invention can be operated through the control of servers, and in the case of a core cloud, the cloud can be directly connected to a cloud server to form a cloud server and manage a cloud service through the control operation of the cloud server.

In the case of a regional cloud and an edge cloud, which are clouds formed by adding computing resources to network devices forming a network, the cloud can be arranged on a single node of the network, and each cloud can manage a cloud service through the control operations of the cloud server formed on the corresponding node.

More specifically, a cloud computing system having a distributed cloud environment according to an embodiment of the invention can include a cloud server 1, a core cloud part 10, a regional cloud part 20, an edge cloud part 30, and client terminals, as illustrated in FIG. 4, and can form a core cloud, regional clouds, and edge clouds to provide a cloud service.

The cloud server 1 may store and manage the contents, etc., needed for providing the cloud service to provide control that enables the forming and processing of the cloud service at the core cloud 10. More specifically, the cloud server 1 can include a core cloud part 10, where the core cloud part 10 may form a core cloud server 11, operate the cloud service at the core cloud server, and store and manage the data of said service.

The core cloud processing part 12 may determine whether or not to provide a cloud service corresponding to a request signal.

Also, the regional cloud part 20 can be formed by way of a server formed by a network device formed at any one node of the network and preferably may be arranged at a network node between the core cloud part 10 and the edge cloud part 30. It may form a regional cloud server 21 and may either store and manage a portion or an entirety of the cloud service of the core cloud part 10 and data associated with said service in the regional cloud server 21 or receive cloud service packet information from the core cloud part 10 to provide the cloud service to a subscriber client terminal.

Also, the regional cloud part 20 may include a regional cloud awareness part 22, which may determine whether or not identification is possible for a cloud service request signal transmitted from a publisher client terminal. The regional cloud part 20 may further include a regional cloud processing part 23, which may determine whether or not to provide the cloud service corresponding to the request signal if there is identification by the regional cloud awareness part 22.

Also, if a cloud service corresponding to the request signal exists in the regional cloud server 21, the regional cloud processing part 23 may provide said cloud service to the subscriber client terminal wishing to receive the cloud service corresponding to the request signal, and if it does not, the regional cloud processing part 23 may transmit the request signal to the core cloud part 10.

Also, the edge cloud part 30 may form an edge cloud and may be arranged on a network node connected to client terminals to form an edge cloud server 31, providing the cloud service to the client terminals by storing and managing a portion of the cloud service of the core cloud part 10 in the edge cloud server 31 or receiving cloud service packet information from the core cloud part 10 or from the regional cloud part 20.

Also, the edge cloud part 30 may include an edge cloud awareness part 32, which may determine whether or not identification is possible with respect to a cloud service request signal transmitted from a publisher client terminal, from among the client terminals. The edge cloud part 30 can further include an edge cloud processing part 33, which may determine whether or not to provide the cloud service corresponding to the request signal when there is identification by the edge cloud awareness part 32.

Also, the edge cloud awareness part 32 may transmit the request signal to the core cloud part 10 or the regional cloud part 20 if identification is not possible for the cloud service request signal and transmit the request signal to the edge cloud processing part 33 if identification is possible. That is, in cases where there are no separate regional cloud parts 20, the request signal may be transmitted directly to the core cloud part 10, and in cases where there are regional cloud parts 20, the request signal may be transmitted to a regional cloud part 20 to process the cloud service request.

Also, the edge cloud processing part 33 may decide whether or not to provide a cloud service by comparing the cloud service corresponding to the received request signal with cloud service resources stored in the edge cloud server 31.

More specifically, if according to the comparison result a cloud service corresponding to the request signal exists in the edge cloud server 31, the edge cloud processing part 33 may provide said cloud service to the subscriber client terminal that wishes to receive the cloud service corresponding to the request signal, and if such cloud service does not exist, the edge cloud processing part 33 may transmit the request signal to the core cloud part 10 or the regional cloud part 20.

In response, the core cloud part 10 may recognize the request signal transmitted from the edge cloud part 30 and subsequently provide the cloud service corresponding thereto to the subscriber client terminal, and the regional cloud part 20 may process the request signal according to the procedures mentioned above (i.e. procedures similar to those of the edge cloud part 30).

Also, the core cloud part 10 may not create a backward packet for providing to the edge cloud part 30, if the subscriber client terminal is not connected to the edge cloud part 30 that has transferred the request signal. This is to minimize unnecessary load and message transfer procedures. In the case of the regional cloud part 20 also, when it is possible to provide a service corresponding to the request signal, the regional cloud part 20 may not create a backward packet for providing to the edge cloud part 30 if the subscriber client terminal is not connected to the edge cloud part 30 that transferred the request signal, in the same manner as for the core cloud part 10.

Next, the procedures for a distributed messaging service using a cloud computing system according to an embodiment of the invention are described below, with reference to FIG. 5 and FIG. 6.

Figure 5:
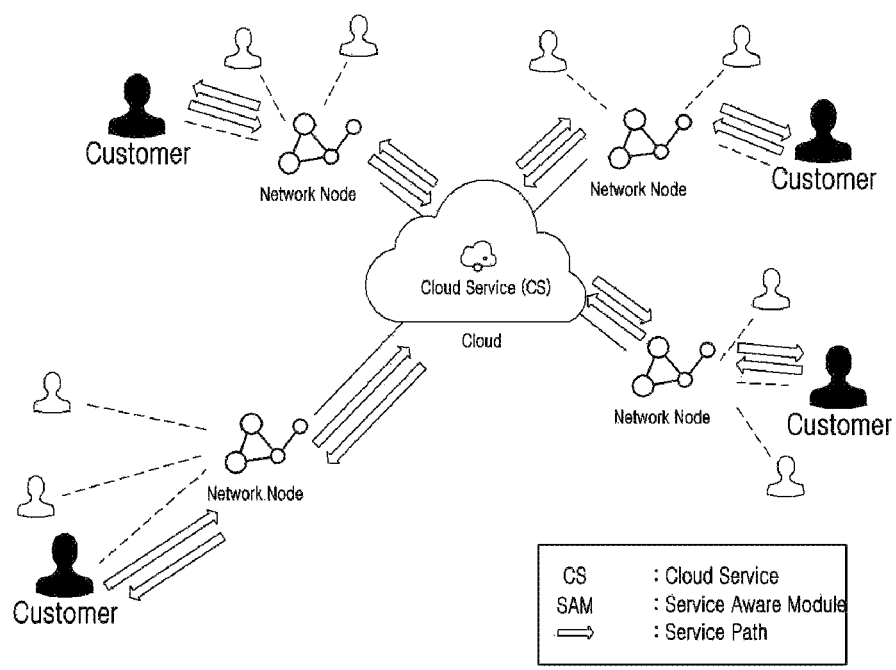
FIG. 5 is a conceptual diagram illustrating the procedures of a messaging service in a centralized cloud environment according to the related art.
Figure 6:
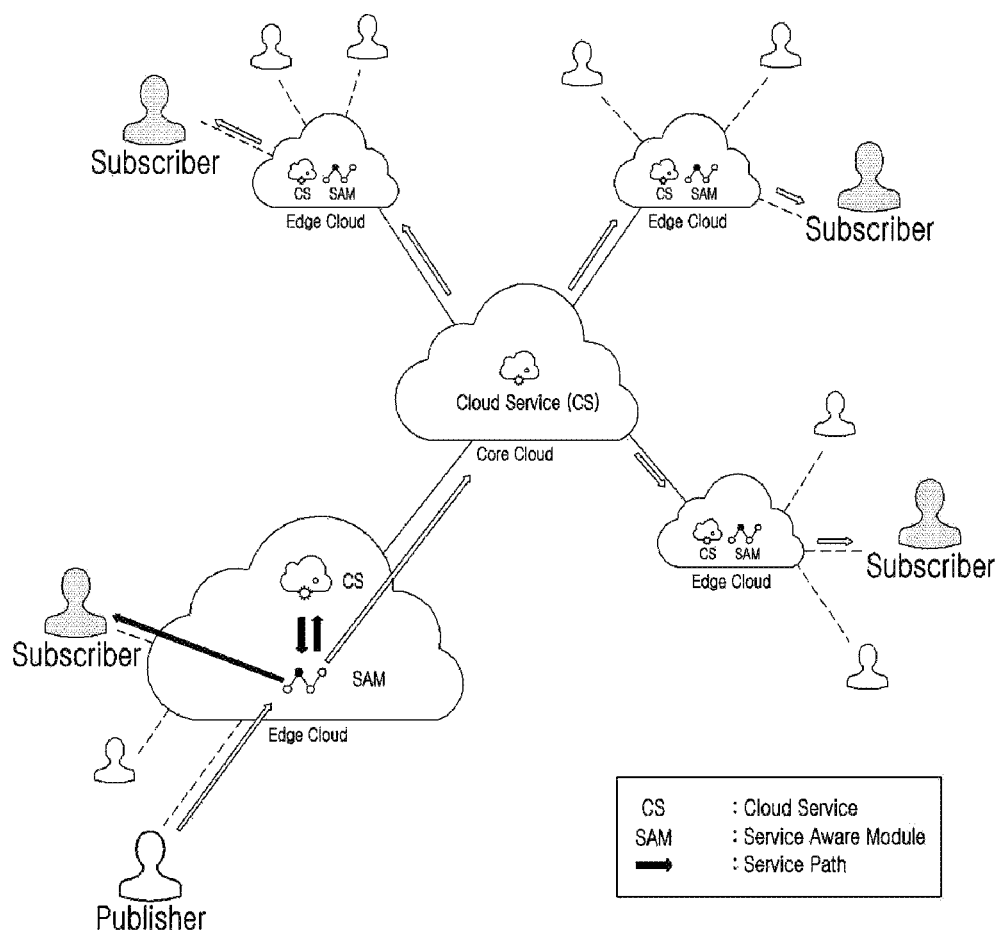
FIG. 6 is a conceptual diagram illustrating the procedures of a distributed messaging service implemented with a cloud computing system according to an embodiment of the invention.

FIG. 5 is a conceptual diagram illustrating the procedures of a messaging service in a centralized cloud environment according to the related art, and FIG. 6 is a conceptual diagram illustrating the procedures of a distributed messaging service implemented with a cloud computing system according to an embodiment of the invention.

With the messaging service, a message published by a publisher regarding a particular topic may be transferred to all subscribers that have subscribed to said topic. FIG. 5 illustrates a messaging service based on a centralized cloud environment according to the related art, while FIG. 6 illustrates a messaging service based on the distributed cloud environment using a cloud computing system according to an embodiment of the invention.

As illustrated in FIG. 5, in a centralized cloud environment, sending messages to a subscriber that is at a close distance on the network unavoidably requires using the messaging service from the central cloud. In contrast, in the cloud environment illustrated in FIG. 6, it may be determined autonomously whether or not a service capable of performing messaging is present in the edge cloud server by way of the SAM (service aware module) of the edge cloud.

If a messaging service exists in the edge cloud, messaging between a publisher and subscribers within the same edge cloud can be performed immediately. Since the message has to be transferred to subscribers of other edge cloud environments that are connected to the same core cloud, the message may be transferred to the core cloud to perform the messaging.

If a messaging service does not exist in the edge cloud, then the messaging service in the core cloud may be used, similarly to the centralized cloud environment of FIG. 5.

Next, the flow of load detachment in a cloud computing system according to an embodiment of the invention is described below, with reference to FIG. 7.

Figure 7:
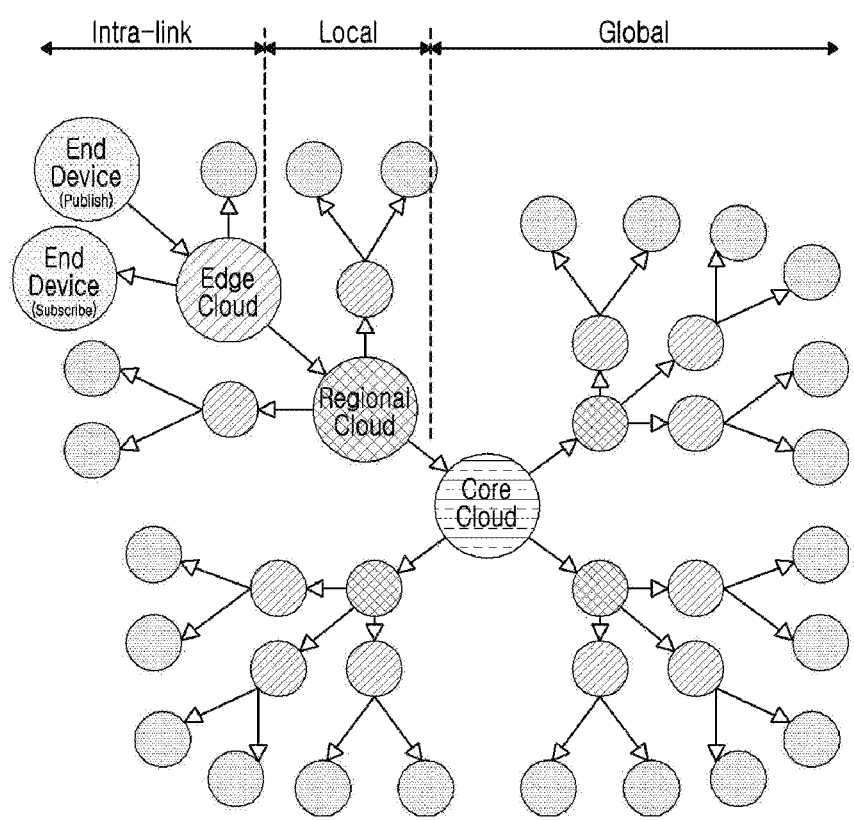
FIG. 7 is a conceptual diagram illustrating the flow of load detachment in a cloud computing system according to an embodiment of the invention.

FIG. 7 is a conceptual diagram illustrating the flow of load detachment in a cloud computing system according to an embodiment of the invention.

Primarily, the flow process of FIG. 7 presumes that the edge cloud or regional cloud recognizes (service-aware) a service request and then transfers the request to an upper network level (regional cloud or core cloud). The flow process of FIG. 7 is shown as a graph that generalizes the conceptual diagrams illustrated in detail in FIG. 5 and FIG. 6 into a centered graph type.

As illustrated in FIG. 7, each edge cloud may be connected with two end devices, each regional cloud may be connected with three edge clouds, and the core cloud may be connected with four regional clouds.

Message brokers may exist in all of the edge, regional, and core clouds, and messages may be sent to lower-level nodes connected to edge or regional clouds by way of service awareness. As illustrated in FIG. 7, a directed graph is shown, as it is basically assumed that there are no transfers in backward directions (towards lower-level nodes). Here, a published message may be mediated by message brokers to be transferred to subscribers.

Next, the efficiency of a method of load detachment for a cloud computing system according to an embodiment of the invention is considered below, with reference to Table 1.

Table 1 lists the basic terms (mathematical terms) for calculating the ratio of load processed within the range of an edge cloud or a regional cloud using the number of subscriber end devices connected to the edge cloud or regional cloud.

TABLE 1

| Notation | Description |
| --- | --- |
| R | Ratio |
| $R_{target}$ | Ratio of target |
| LD | Load Detachment |
| CONN | Number of Connections |
| $CONN_{range}$ | Number of Connections within range |

Calculating the ratio of load processed within the range of an edge cloud or a regional cloud using the mathematical terms of Table 1 can follow Equation 1 shown below.

$$R_{LD} = \frac{CONN_{intr-link} + CONN_{local}}{CONN_{all}} \quad \text{(Equation 1)}$$

Equation 1 is an equation for obtaining the ratio of messages processed locally (which includes the intra-link and local ranges in FIG. 7) by dividing the number of subscriber end devices connected within the intra-link and local ranges by the number of overall subscriber end devices.

For example, in FIG. 7, the edge cloud on the top left that includes the publisher end device includes two subscriber end devices under it ($CONN_{intr-link}=2$), and the region cloud at its upper level includes four subscriber end devices under it ($CONN_{local}=4$), while the overall number of subscriber end devices, including the above, is a total 24 ($CONN_{all}=24$). Therefore, according to Equation 1 above, the ratio of $(2+4)\div24\times100=25\%$ can be derived. That is, it can be seen that the cloud composition of FIG. 7 can achieve a load detachment effect of 25% compared to the centralized cloud scheme based on the related art.

Figure 8:
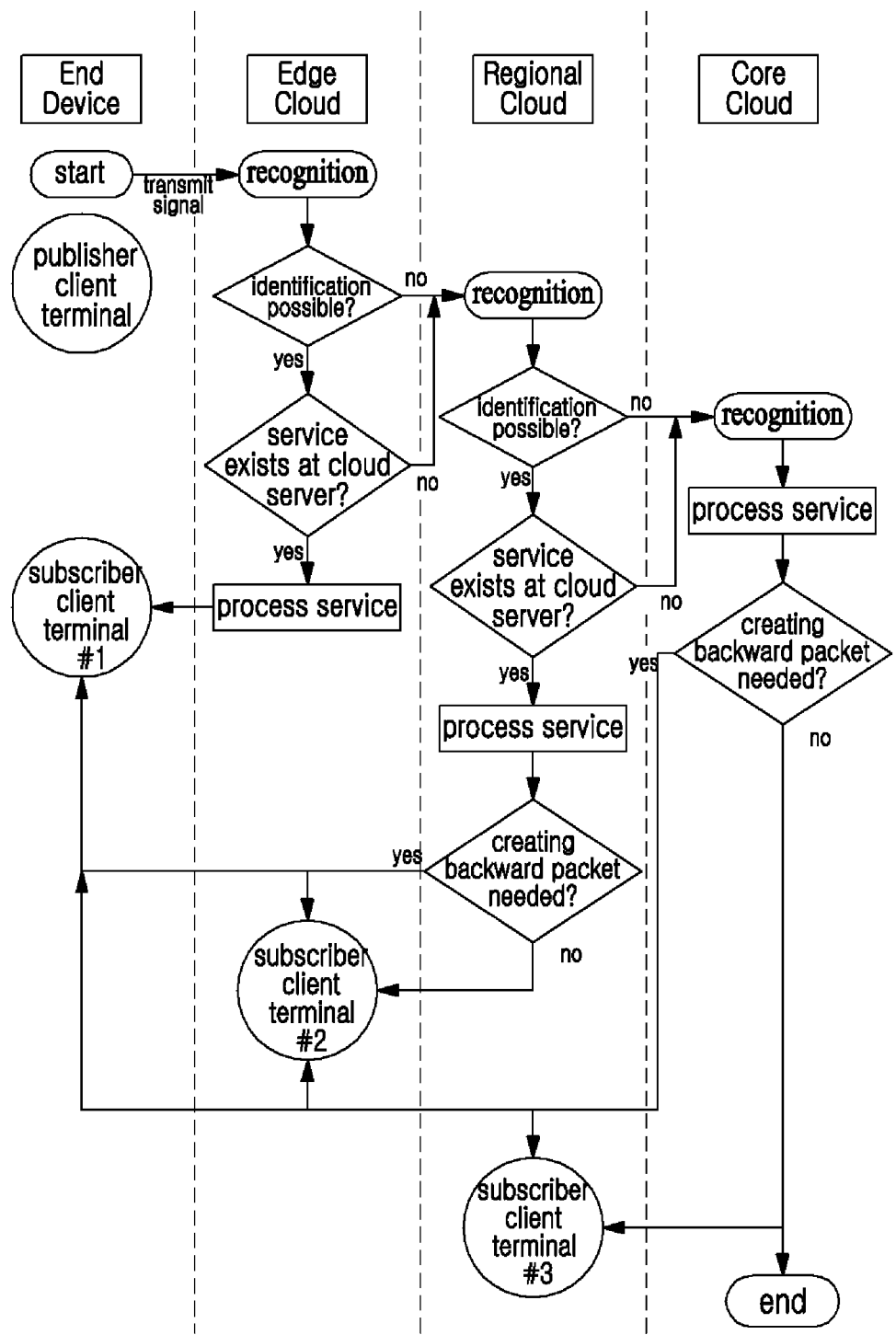
FIG. 8 is a flow diagram illustrating the procedures of a method for detaching load in a cloud computing system according to an embodiment of the invention.

Finally, a method for detaching load in a cloud system according to an embodiment of the invention is described below, with reference to FIG. 8. FIG. 8 is a flow diagram illustrating the procedures of a method for detaching load in a cloud computing system according to an embodiment of the invention.

Basically, a method of detaching load in a cloud system according to an embodiment of the invention can be implemented in a cloud computing system in which cloud servers that provide cloud services and client terminals that request or are provided with cloud services are connected over a particular network.

Also, a method of detaching load in a cloud system according to an embodiment of the invention can include: step no. 1 of arranging an edge cloud, which may be formed with a particular cloud server, on a network node connected to the client terminal; step no. 2 of determining whether or not identification is possible for a cloud service request signal transmitted from a publisher client terminal from among the client terminals at the edge cloud; step no. 3-1 of providing a cloud service corresponding to the request signal to a subscriber client terminal wishing to receive the cloud service, if the cloud service corresponding to the request signal is being operated at a cloud server of the edge cloud, and if it is determined in said step no. 2 that identification is possible for the request signal; step no. 3-2 of transmitting the request signal to a core cloud that is connected to a cloud server and formed with a particular cloud server, if it is not determined in said step no. 2 that identification is possible for the request signal or if the cloud service corresponding to the request signal is not being operated at the cloud server of the edge cloud; step no. 4-1 of not creating a backward packet for providing to the edge cloud, if the subscriber client terminal is not connected to the edge cloud that has transmitted the request signal; and step no. 4-2 of identifying the request signal and subsequently providing the cloud service corresponding thereto to the subscriber client terminal.

Also, in step no. 3-1, the cloud service stored or operated in the cloud server of the edge cloud can include a portion of or all of the cloud service operated at the cloud server of the core cloud.

A more detailed process of applying a method for detaching load in a cloud system according to an embodiment of the invention that can be implemented by the steps described above is described below, with reference to FIG. 8.

As illustrated in FIG. 8, when a cloud service request signal is first created at a publisher client terminal in an end device, the edge cloud recognizes this and determines whether or not identification is possible. If the content is identifiable, the edge cloud determines whether or not said cloud service exists in the cloud server. If said cloud service does exist, service processing is performed to provide said cloud service to the subscriber client terminal side.

If identification is not possible at the edge cloud or if said service does not exist in the cloud server of the edge cloud, the request signal may be transmitted to the regional cloud, which is at its upper level.

The regional cloud may recognize the request signal and, similarly to the edge cloud, may determine whether or not identification is possible and whether or not said service exists in the cloud server of the regional cloud. If the result of the determining is that the service is one that can be processed within the regional cloud, said service may be processed, checking whether or not there are subscriber client terminals connected to the lower-level edge clouds to decide whether or not to create backward packets for transmitting towards the edge clouds (backward direction). If there are no subscriber client terminals present in the edge clouds of the lower level, relevant packets may be transmitted to the subscriber clients connected to the lower-level edge clouds belonging to the local range without separately creating backward packets. If there are subscriber client terminals present, a backward packet may be created and transmitted to the edge cloud to which the publisher client terminal is connected.

If identification is impossible at the regional cloud or if said service does not exist at the cloud server of the regional cloud, the request signal may be transmitted to the upper level, the core cloud.

The core cloud may recognize the received request signal and process said service (provide processing such that the cloud service corresponding to the request signal is provided to the subscriber client terminals). Also, similarly to the regional cloud, the core cloud may ascertain whether or not there are subscriber client terminals at the lower-level edge cloud that has transmitted the request signal to decide whether or not to generate a backward packet. According to this decision, a backward packet may be created and transmitted to the lower-level cloud, or measures may be taken such that the relevant cloud service is provided to other subscriber client terminals.

A more detailed description of the load detachment method in a cloud system according to an embodiment of the invention is provided below with reference to FIG. 8.

The basic concept of load detachment lies in processing the created load at the corresponding cloud (edge cloud or regional cloud) before transferring it to the upper-level network, so as to reduce the load that comes back down from the upper-level to the lower-level network. The order of the load processing and the transferring to the upper-level network can be changed.

Also, the concept of load processing here represents processing the costs that are incurred while providing a service or transferring packets.

Considering again FIG. 6, the publisher has published a message with the message broker of the core cloud, and since performing service identification (service awareness) at the connected edge cloud (bottom left in the drawing) reveals that a message broker capable of handling the message exists in the edge cloud, the message is transferred. Thus, the message is pushed to the subscriber node at the lower level of said edge cloud.

However, there can exist a case in which the edge cloud deals with the load and does not transfer the load to the core cloud (i.e. the upper-level network). In this case, it may occur that other subscribers connected to the core cloud do not receive the message. Therefore, in cases such as a messaging service, it is necessary to process the load and send it to the upper level. That is, since load is detached at the lower levels and there is no need for messaging to occur backward in said direction, the load on the core cloud can be reduced. FIG. 8 illustrates the flow of the procedures described above.

That is, when a particular cloud service is requested at the end device, the edge cloud may perform service identification (service-aware). If a service that can be processed at said edge cloud does not exist, the request may be forwarded to the upper-level network.

If a service that can be processed at said edge cloud does exist, then it may be determined whether or not the request is to be transferred to the upper level, transferring the request if so and not transferring the request if not.

After the request is processed (load is processed) at said edge cloud, the request may be transferred to the corresponding nodes (in this case, end devices). If the request was transferred to an upper-level network in a previous step (e.g. transferred from an edge cloud to a regional cloud), then the regional cloud may perform the same operations as those performed at the edge cloud. One difference is with regard to whether or not a backward packet is to be created for the edge cloud from which the request was received.

According to whether or not a backward packet is to be transferred, the backward may or may not be created. Lastly, if the request is transferred from the regional cloud to the core cloud, the operations performed at the previous regional cloud may be repeated, transferring to the node the results of the request which could not be dealt with by the edge cloud and regional cloud.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on said operating system. Also, the processing device can access, store, manipulate, process, and generate data in response to an execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents.

Therefore, various other implementations, various other embodiments, and equivalents of the invention disclosed in the claims are encompassed by the scope of claims set forth below.

| [Description of Numerals] | |
|---|---|
| 1: cloud server | 10: core cloud part |
| 11: core cloud server | 12: core cloud processing part |
| 20: regional cloud part | 21: regional cloud server |
| 22: regional cloud awareness part | 23: regional cloud processing part |
| 30: edge cloud part | 31: edge cloud server |
| 32: edge cloud awareness part | 33: edge cloud processing part |

What is claimed is:

1. A cloud computing system comprising a cloud server configured to provide a cloud service and a client terminal configured to request or be provided with the service, the cloud server and the client terminal connected over a particular network, the cloud computing system comprising:
   a core cloud part connected to the cloud server to form a core cloud server and configured to store and manage the cloud service in the core cloud server; and
   an edge cloud part arranged on a network node connected with the client terminal to form an edge cloud server and configured to operate a portion or an entirety of a cloud service of the core cloud part at the edge cloud server, the edge cloud part configured to store and manage data of said service or receive cloud service packet information from the core cloud part to provide the cloud service to the client terminal,
   wherein the edge cloud part comprises an edge cloud awareness part and an edge cloud processing part, the edge cloud awareness part configured to determine whether or not identification is possible for a cloud service request signal transmitted from a publisher client terminal among the client terminals, the edge cloud processing part configured to determine whether or not to provide the cloud service corresponding to the request signal in an event of an identification by the edge cloud awareness part, and
   wherein the cloud computing system is further configured to,
      determine whether the edge cloud part is connected to a subscriber client terminal among the client terminals that has transmitted the request signal, and
      transmit a backward packet to the edge cloud part based on the determining whether the edge cloud part is connected to the subscriber client terminal.

2. The cloud computing system of claim 1, wherein the edge cloud awareness part transmits the request signal to the core cloud part if identification is not possible for the cloud service request signal and transmits the request signal to the edge cloud processing part if identification is possible,
   and the edge cloud processing part decides whether or not to provide the cloud service by comparing the cloud service corresponding to the received request signal with cloud service resources stored in the edge cloud server.

3. The cloud computing system of claim 2, wherein, if a result of the comparison is that a cloud service corresponding to the request signal exists in the edge cloud server, the edge cloud processing part provides said cloud service to a subscriber client terminal wishing to receive the cloud service corresponding to the request signal, and if a cloud service corresponding to the request signal does not exist, the edge cloud processing part transmits the request signal to the core cloud part.

4. The cloud computing system of claim 3, wherein the core cloud part recognizes the request signal transmitted from the edge cloud part and provides a corresponding cloud service to the subscriber client terminal.

5. The cloud computing system of claim 1, further comprising:
   a regional cloud part arranged on a network node between the core cloud part and the edge cloud part to form a regional cloud server and configured to operate a portion or an entirety of a cloud service of the core cloud part at the regional cloud server, the regional cloud part configured to store and manage data of said service or receive cloud service packet information from the core cloud part to provide the cloud service to the client terminal.

6. The cloud computing system of claim 5, wherein the regional cloud part comprises a regional cloud awareness part and a regional cloud processing part, the regional cloud awareness part configured to determine whether or not identification is possible for a cloud service request signal transmitted from the publisher client terminal, the regional cloud processing part configured to determine whether or not to provide a cloud service corresponding to the request signal in an event of an identification by the regional cloud awareness part.

7. The cloud computing system of claim 6, wherein, if a cloud service corresponding to the request signal exists in the regional cloud server, the regional cloud processing part provides said cloud service to a subscriber client terminal wishing to receive the cloud service corresponding to the request signal, and if a cloud service corresponding to the request signal does not exist, the regional cloud processing part transmits the request signal to the core cloud part.

8. The cloud computing system of claim 5, wherein the determining whether the edge cloud part is connected to the subscriber client terminal and the transmitting the backward packet are performed by the regional cloud part.

9. The cloud computing system of claim 1, wherein the determining whether the edge cloud part is connected to the subscriber client terminal and the transmitting the backward packet are performed by the edge cloud part.

10. A method of detaching load in a cloud computing system comprising a cloud server configured to provide a cloud service and a client terminal configured to request or be provided with the service, the cloud server and the client terminal connected over a particular network, the method comprising:
- step no. 1 of arranging an edge cloud on a network node connected to the client terminal, the edge cloud formed with a particular cloud server;
- step no. 2 of determining whether or not identification is possible for a cloud service request signal transmitted from a publisher client terminal among the client terminals at the edge cloud;
- step no. 3-1 of providing a cloud service corresponding to the request signal to a subscriber client terminal wishing to receive the cloud service if the cloud service corresponding to the request signal is being operated at a cloud server of the edge cloud, if it is determined in said step no. 2 that identification is possible for the request signal;
- step no. 3-2 of transmitting the request signal to a core cloud connected to a cloud server and formed with a particular cloud server, if it is not determined in said step no. 2 that identification is possible for the request signal or if the cloud service corresponding to the request signal is not being operated at the cloud server of the edge cloud;
- step no. 4-1 of,
  - determining whether the edge cloud that has transmitted the request signal is connected to the subscriber client terminal, and
  - transmitting a backward packet to the edge cloud that has transmitted the request signal based on the determining whether the edge cloud that has transmitted the request signal is connected to the subscriber client terminal; and
- step no. 4-2 of identifying the request signal and providing the cloud service corresponding thereto to the subscriber client terminal.

11. The method of detaching load in a cloud computing system according to claim 10, wherein in said step no. 3-1, the cloud service stored in the cloud server of the edge cloud is a portion of the cloud service operated at the cloud server of the core cloud.

12. The method of claim 10, wherein step no. 4-1 is performed by the edge cloud.

13. The method of claim 10, wherein,
- the cloud computing system further comprises a regional cloud arranged on a network node between the core cloud and the edge cloud to form a regional cloud server and configured to operate a portion or an entirety of the cloud service of the core cloud at the regional cloud server, the regional cloud configured to store and manage data of said service or receive cloud service packet information from the core cloud to provide the cloud service to the client terminal; and
- step no. 4-1 is performed by the regional cloud.

* * * * *